(12) United States Patent
Biswas et al.

(10) Patent No.: US 10,204,318 B2
(45) Date of Patent: Feb. 12, 2019

(54) PROJECT ASSET AND PREFERENCE SHARING

(71) Applicant: Adobe Systems Incorporated, San Jose, CA (US)

(72) Inventors: Sanjeev Kumar Biswas, Bangalore (IN); Dhiraj Sadhwani, Bangalore (IN); Arijit Chatterjee, Bangalore (IN)

(73) Assignee: Adobe Inc., San Jose, CA (US)

( * ) Notice: Subject to any disclaimer, the term of this patent is extended or adjusted under 35 U.S.C. 154(b) by 674 days.

(21) Appl. No.: 14/755,255

(22) Filed: Jun. 30, 2015

(65) Prior Publication Data

US 2017/0004447 A1    Jan. 5, 2017

(51) Int. Cl.
*G06Q 10/10* (2012.01)

(52) U.S. Cl.
CPC ................... *G06Q 10/101* (2013.01)

(58) Field of Classification Search
CPC .......................... G06Q 10/101; G06Q 10/103
USPC ......................................................... 705/300
See application file for complete search history.

(56) References Cited

U.S. PATENT DOCUMENTS

2016/0070777 A1* 3/2016 Lubeck ............ G06F 17/30867
707/740

* cited by examiner

*Primary Examiner* — Maria C Santos-Diaz
(74) *Attorney, Agent, or Firm* — Wolfe-SBMC

(57) ABSTRACT

Project asset and preference sharing techniques are described. In one or more embodiments, a request is received to assign a project asset or preference to a member of a team. The received request includes an identifier of a project for which the project asset or preference will be assigned. To assign the asset or preference specified in the request, a list of teams to which the member belongs is ascertained. The assets and preferences associated with each of the teams are then checked for the identifier to identify the project assets and preferences associated with the project. Once the project assets and preferences associated with the project are identified, a response is generated for communication to the member. The response is configured to include indications of the identified project assets and preferences that enable the member to access the identified project assets and preferences via the application, such that the member is also given access to the assigned project asset or preference.

20 Claims, 9 Drawing Sheets

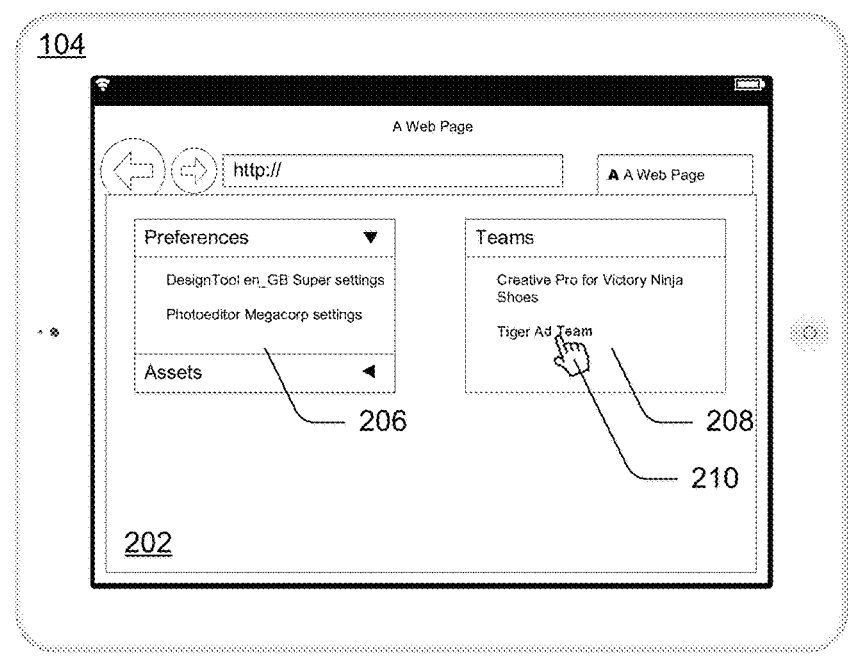
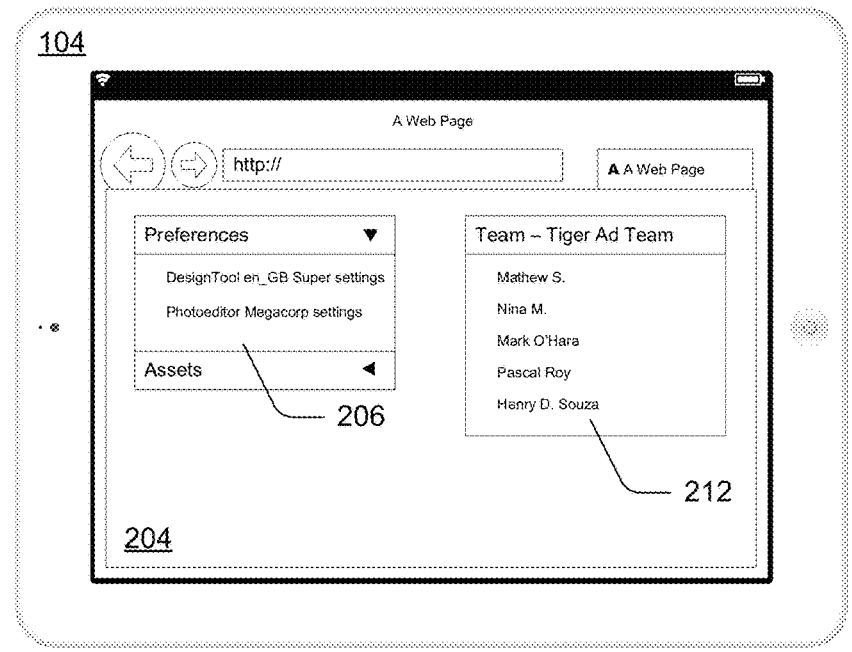
Fig. 2

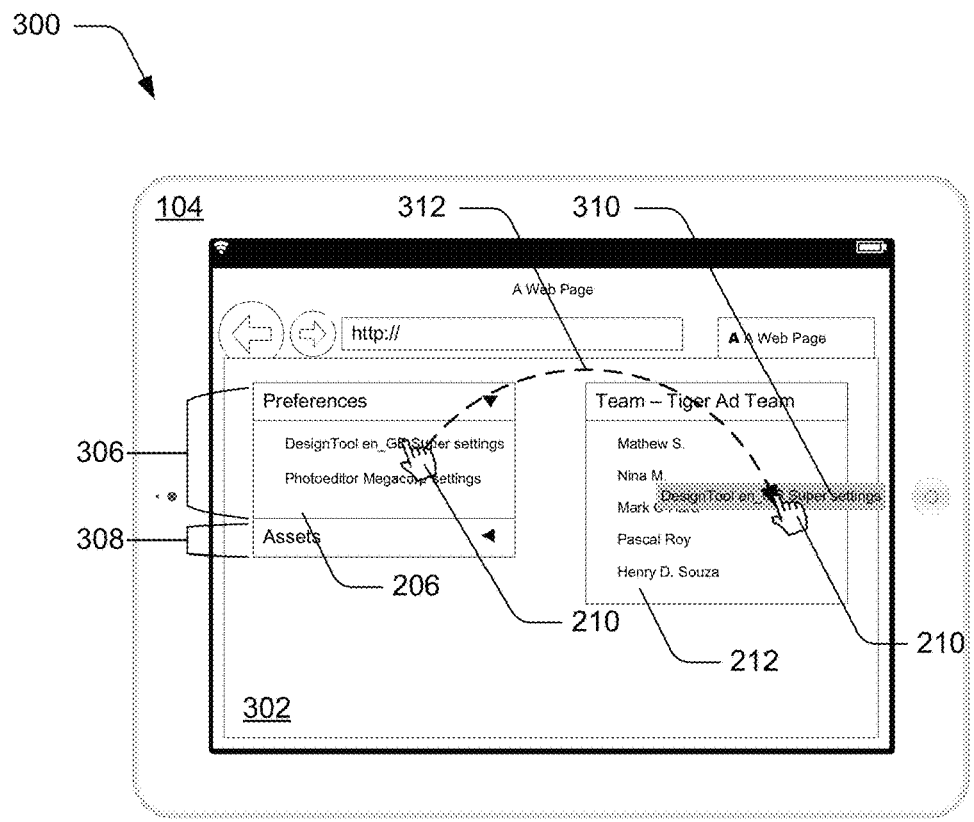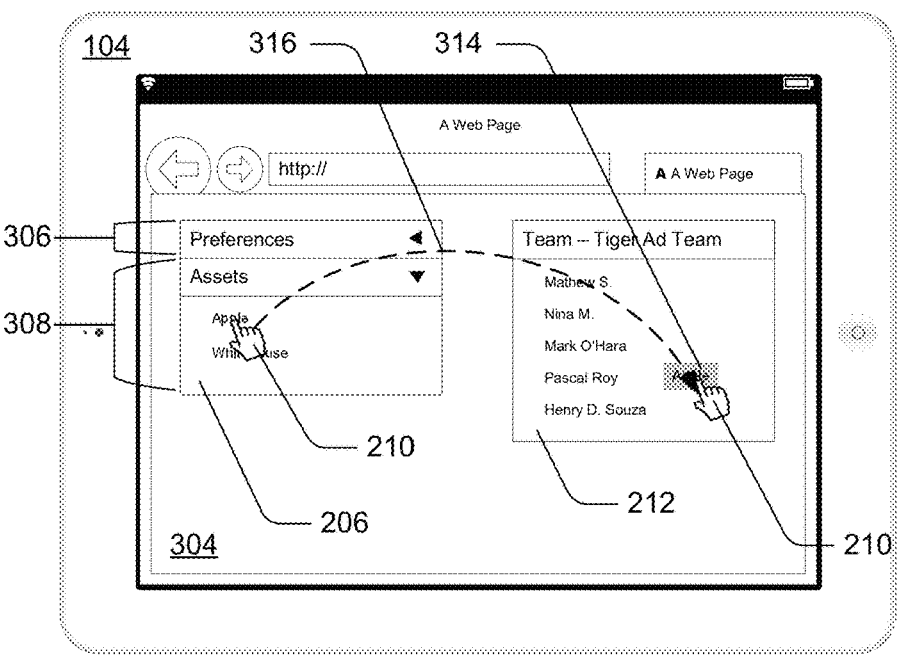
Fig. 3

500 ⟶

502
Receive a request to assign a project asset or preference to a member of a team, the request including an identifier of a project for which the project asset or preference will be assigned

↓

504
Ascertain a list of teams to which the member belongs

↓

506
Check assets and preferences associated with the teams on the list to identify, using the identifier, the project assets and preferences associated with the project

↓

508
Generate a response for communication to the member that includes indications of the identified project assets and preferences that enable the member to access the identified project assets and preferences

*Fig. 5*

PROJECT ASSET AND PREFERENCE SHARING

BACKGROUND

Content creators increasingly use computer applications for creation and modification of different types of content, e.g., music, movies, television, images, books, magazines, advertising, and so on. Further, advances in collaboration techniques have enabled multiple members of a team to work together on content projects using these computer applications. Consider an example in which a team uses a suite of content-creation applications to collaborate on the creation of a video clip, such as an advertisement. Using such a suite, the team can have one member produce a soundtrack for the advertisement and another member edit video for the advertisement.

In conjunction with producing content projects, project assets can be created that are used by members of a team to modify the content of the project, e.g., brushes, images, colors, and so forth. Project preferences can also be set that are used by the members of the team to modify configurations of content-creation applications, e.g., to make functions frequently used on a given project more easily accessible. Over time, however, members may leave the team for various reasons and others may join the team as new members. Contractors, for example, may become members of a team for a short period of time for the purpose of adding to a content project in some limited way. To enable a contractor to effectively work on the project with the rest of the team, the contractor is given access to the project assets and preferences. The contractor's access can also be retracted once his or her work is complete. However, conventional techniques for granting and retracting access to project assets and preferences are cumbersome—both on the part of an administrative team member responsible for granting access to other members as well as on the part of the other members who apply the project assets and settings once access is granted.

SUMMARY

Project asset and preference sharing techniques are described. In one or more embodiments, a request is received to assign a project asset or preference to member of a team. The received request includes an identifier of a project for which the project asset or preference will be assigned. A project asset refers to a created content item or a tool for content creation that is usable by the member to modify the project. By way of example, project assets comprise at least one of an image, a brush, or a color. In contrast, a project preference refers to a setting to configure an application that is used to modify the project. By way of example, a project preference may be used to apply a theme to at least a portion of the application used to modify the project.

To assign the asset or preference specified in the request, a list of teams to which the member belongs is ascertained. The assets and preferences associated with each of the teams are then checked for the identifier to identify the project assets and preferences associated with the project. Once the project assets and preferences associated with the project are identified, a response is generated for communication to the member. The response is configured to include indications of the identified project assets and preferences that enable the member to access the identified project assets and preferences via the application used to modify the project. In one or more embodiments, the indications are uniform resource identifiers (URIs) that enable access to a corresponding project asset or preference via the application.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 2 is an example embodiment showing a user interface that enables an administrative member of a content project team to select teams and individuals on teams with which to share project assets and preferences.

FIG. 3 is an example embodiment showing the user interface of FIG. 3 and operations performed by the administrative member to assign a project preference and a project asset for sharing with a selected team.

FIG. 5 is a flow diagram depicting an example procedure in accordance with one or more embodiments.

DETAILED DESCRIPTION

Overview

Figure 1:
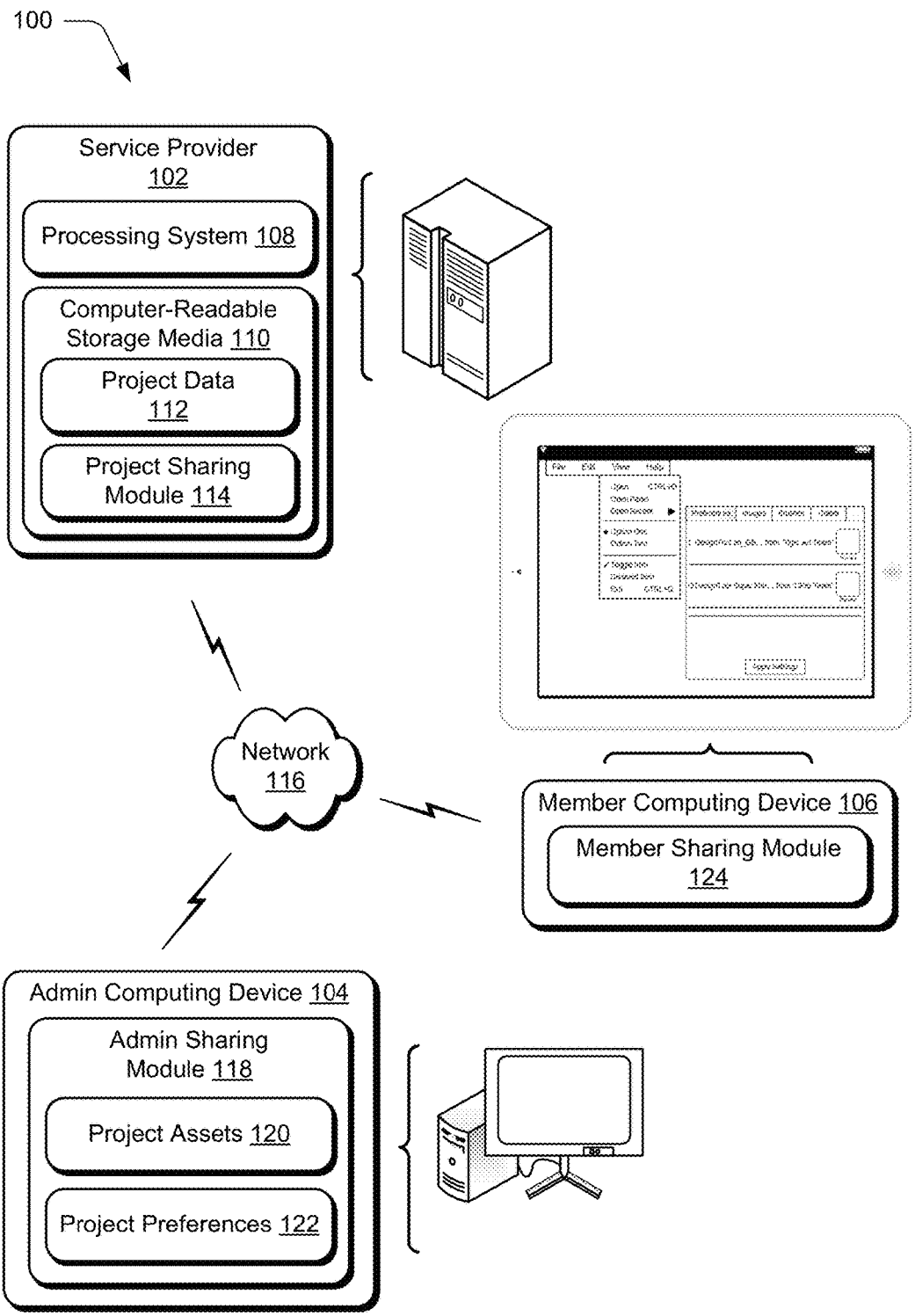
FIG. 1 is an illustration of an environment in an example embodiment that is operable to employ techniques described herein.

Collaborative content-creation work environments often allow a content project team to share project assets and preferences among its members. Conventional techniques for granting and retracting access to project assets and preferences are cumbersome, however. To assign project assets or preferences to a new member, for example, some conventional techniques involve a process in which a member who is to receive access to the project assets and preferences starts an application used to modify content of the project. Through a menu of the application, the member selects to launch a user interface for an administrative member of the team. Once launched, the administrative member can log into the user interface and download the assets and preference settings for the member. In some cases the administrative member performs this task while sitting at the member's computer. In others, the administrative member performs this task over a remote desktop connection. In any case, doing so is inconvenient for both the administrative member and the member receiving access.

Project asset and preference sharing techniques are described. In one or more embodiments, a project sharing service provides functionality that allows an administrative member to easily assign and retract access to project assets and project preferences, e.g., with drag-and-drop inputs via an admin user interface. As used herein, a "project asset" refers to a created content item or a tool for content creation that is usable by a member of a project team to modify the project. By way of example, project assets may include images (e.g., that can be incorporated into other images, videos, and so on), brushes, colors, audio filters, sound bites, audio tracks (e.g., that can be incorporated into a larger audio track, a video clip, and so on), video filters, video clips, and so forth. A "project preference" refers to a setting for configuring an application that is used to modify the project or a setting for adding or modifying information associated with the project. Project preferences may include, for example, settings to configure user interface components (e.g., menus, toolbars, and so on) of applications used to modify the project. Consider a scenario in which a function that is used frequently in a given content project is generally accessible by opening a menu, selecting a menu item to open a dialog box, selecting one of multiple tabs in the dialog box, selecting a button included in the dialog box (e.g., an "Advanced" button) to open a second dialog box, and then selecting a radio button to access the desired functionality. Assume in this scenario, that a member of the team opts to change settings in his or her version of the application to make this function's radio button available from a main view, such that the member can simply select the radio button from the main view and without going through the above-described steps. Using the techniques described herein, such setting changes can be shared with other members of the team. Project preferences can also include settings to impart themes on the content-creation applications, settings to add metadata (e.g., project name, author(s), company, credits, and so on) to the project, and so forth.

Using the techniques described herein, an administrative member of a team assigns a project asset or preference to members of a team by selecting the project asset or preference from a window in an admin user interface, dragging the selected project or asset over to a team window, and then dropping the selected project asset in the window for the whole team or for particular members of the team. A request to assign the selected project asset or preference is then communicated to the project sharing service, which effectuates the assignment. The project sharing service effectuates the assignment, in part, by communicating a response to the request to computing devices of the members assigned the project asset or preference. The response enables the members to access assets and preferences of the project, including the assigned project asset or preference. In particular, the response enables a non-administrative member user interface to be displayed to the member that allows the member to preview the assigned project asset or preference and select to apply the assigned project asset or preference to the content project. Once a member selects to have the project asset or preference applied, data enabling access to the project asset or preference is downloaded to the member's computer. The downloaded data enables the project asset or preference to be accessed through a corresponding content-creation application. Unlike conventional techniques, the project asset and preference sharing techniques enable administrative team members to assign project assets and preferences to other team members without physically being at computers of the other members or remotely accessing them.

In addition to granting access to project assets and preferences, the techniques described herein also enable administrative members to retract access to assigned project assets and preferences. For example, an administrative member can, through the admin user interface, view the project assets and preferences assigned to a team, or to a particular member. Via the admin user interface, the administrative member can select to retract project-asset and project-preference access from the team or from individual members. Responsive to such a selection, the project sharing service communicates a response indicative of the retraction to corresponding member computing devices. The response is processed by deleting the downloaded data that enables access to the project assets and preferences. By deleting this data, access to the project assets and preferences is disabled.

In the following discussion, an example environment is first described to employ the techniques described herein. Example implementation details and procedures are then described which are performable in the example environment as well as other environments. Consequently, performance of the example procedures is not limited to the example environment and the example environment is not limited to performance of the example procedures.

Example Environment

FIG. 1 is an illustration of an environment 100 in an example embodiment that is operable to employ techniques described herein. The illustrated environment 100 includes a service provider 102, an admin computing device 104, and a member computing device 106. The service provider 102 represents a computing device having a processing system 108 that includes one or more processing devices (e.g., processors) and one or more computer-readable storage media 110. The computer-readable storage media 110 includes project data 112 and a project sharing module 114 operable via the processing system 108 to implement corresponding functionality described herein. Although not illustrated, the admin computing device 104 and the member computing device 106 also include corresponding processing systems and computer-readable storage media to implement corresponding functionality described herein.

The service provider 102, the admin computing device 104, and the member computing device 106 are configurable as any suitable type of computing device. For example, the service provider 102, the admin computing device 104, and the member computing device 106 may be configured as any combination of a server, a desktop computer, a laptop computer, a mobile device (e.g., assuming a handheld configuration such as a tablet or mobile phone), a device configured to receive gesture input, a device configured to receive three-dimensional (3D) gestures as input, a device configured to receive speech input, a device configured to receive stylus-based input, a device configured to receive a combination of those inputs, and so forth. Thus, the service provider 102, the admin computing device 104, and the member computing device 106 may range from full resource devices with substantial memory and processor resources (e.g., servers, personal computers, game consoles) to a low-resource device with limited memory and/or processing resources (e.g., mobile devices). Additionally, each of the service provider 102, the admin computing device 104, and the member computing device 106 may be representative of a plurality of different devices to perform operations "over the cloud" as further described in relation to FIG. 9.

The service provider 102, the admin computing device 104, and the member computing device 106 illustrated in environment 100 can be configured to communicate with one another over a network 116, such as the Internet, to provide a "cloud-based" computing environment. Generally speaking, a service provider is configured to make various resources available over the network 116 to clients, such as the admin computing device 104 and the member computing device 106. In some scenarios, users may sign up for accounts that are employed to access corresponding resources from a provider. The provider authenticates credentials of a user (e.g., username and password) before granting access to an account and corresponding resources. Other resources are made freely available, (e.g., without authentication or account-based access).

With regard to the techniques described herein, the resources made available by the service provider 102 include services relating to content creation and management of content projects. By way of example and not limitation, such services include, but are not limited to content creation services that offer content creation and editing applications (e.g., Adobe® Creative Cloud, which includes Photoshop®, Illustrator®, Audition®, and so on), digital content storage and/or sharing services, content project management services, and so forth.

Creation of content projects can result in significant amounts of project data. Project data 112 represents the project data that is maintained at the service provider. The admin computing device 104 and the member computing device 106 may also maintain some of the data for content projects, e.g., local copies of the project data 112. Regardless of where the project data 112 is maintained, it can be formatted in any of a variety of different digital formats. When a content project corresponds to an image or includes an image, for instance, the image can be formatted in formats including but not limited to JPEG, TIFF, RAW, GIF, BMP, PNG, and so on. It is to be appreciated that a given content project may include multiple content files that correspond to a variety of different types of content. To this extent, content projects can include a variety of differently formatted files.

The project sharing module 114 represents functionality to implement aspects of techniques for project asset and preference sharing as described herein. For example, project sharing module 114 is configured in various ways to implement a project sharing service. The project sharing service is capable of maintaining data for content projects (e.g., project data 112), such that a content project or portions thereof can be saved with the project sharing service. In conjunction therewith, the project sharing service is also capable of maintaining data indicative of project assets and preferences. Furthermore, access to the project data 112 that is associated with a particular content project is controlled, at least in part, by the project sharing service.

To share a project asset or preference with members of a content project team, an administrative member of the team selects to assign the project asset or preference via an admin user interface. The project sharing module 114 represents functionality to communicate data to the admin computing device 104 that enables the admin user interface to be generated, such as data indicative assets and preferences of a content project. The admin computing device 104 is illustrated with admin sharing module 118, which includes project assets 120 and project preferences 122. The project assets 120 and the project preferences 122 represent, respectively, project asset and project preference data communicated to the admin computing device 104 by the project sharing module 114. Using the project assets 120 and the project preferences 122, the admin sharing module 118 is configured to generate the admin user interface for display. The admin sharing module 118 is also configured to generate asset and preference requests for communication to the service provider 102, which is performed according to assignment selections made by an administrative member of a content project team via the admin user interface.

The project sharing module 114 also represents functionality to process these requests and effectuate the assignment. As part of effectuating the assignment, the project sharing module 114 generates responses for communication to the members that have been assigned project assets or preferences.

The member computing device 106 represents a computing device of a team member who has been assigned a project asset or preference. Included as part of the member computing device 106 is member sharing module 124, which represents functionality to receive and process assignment responses from the project sharing module 114. These assignment responses include indications of the assigned project assets and preferences. The indications enable applications that are usable to modify content of the project to access the assigned project assets and preferences. In one or more embodiments, the indications correspond to uniform resource identifiers (URIs) that are usable by content-creation applications to download data that enables the project assets and preferences to be accessed. Once this data is downloaded to the member computing device 106, the member can use the corresponding project asset or preference to modify the content project.

Although the project sharing module 114 is illustrated as being part of the service provider 102, the project sharing module may be included as part of the admin computing device 104 in one or more embodiments. For example, the project sharing module 114 may be implemented at the admin computing device 104 in embodiments in which data associated with a project is not stored with the project sharing service, but is instead stored on one or more drives (e.g., physical or virtual) of the admin computing device 104. In such embodiments, the project sharing module 114 may access project data for assigning project assets and preferences from storage of the admin computing device 104.

Having considered an example environment, consider now a discussion of some example details of the techniques for project asset and preference sharing in accordance with one or more embodiments.

Project Asset and Preference Sharing Details

This section describes some example details of project asset and preference sharing techniques in accordance with one or more embodiments. FIG. 2 depicts generally at 200 a user interface that enables an administrative member of a content project team to select teams and individuals on teams with which to share project assets and preferences. The user interface depicted at 200 thus represents an "admin user interface" that is displayable by the admin computing device 104, and which is distinguishable from a "non-administrative member user interface". The admin user interface is presented solely to team members designated as administrative members. It is not presented to non-administrative members of teams. In this way, the ability to perform some actions (e.g., assign project assets and preferences) in conjunction with a collaborated-on content project is limited to administrative members. It is to be appreciated that a particular user can be designated as an administrative member for one team and as a non-administrative member for another team without departing from the spirit or scope of the techniques described herein. To this extent, the particular user can be presented the admin user interface in association with the one team but not in association with the other.

FIG. 2 includes a first instance 202 and a second instance 204 of the admin user interface. Both the first instance 202 and the second instance 204 include a preferences and assets selection window 206 ("P&A selection window 206"). In addition to the P&A selection window 206, the first instance 202 includes a team selection window 208. The team selection window 208 allows an administrative member to select a project team to which project assets and preferences can be assigned. The first instance 202 is also shown with the cursor 210 over the "Tiger Ad Team" indication in the team selection window 208. The cursor 210 represents the ability to select a project team (e.g., Tiger Ad Team) for assigning project assets and preferences. In one or more embodiments, the cursor 210 may not be displayed. For example, a display on which the admin user interface is displayed may support touch functionality. Touch functionality can enable a user to simply touch a portion of the display to make a team selection (e.g., with a finger or a stylus). Accordingly, selections can be made relative to the admin user interface using touch functionality and therefore without using a cursor.

Responsive to selection of a team indication (e.g., the "Tiger Ad Team" or the "Creative Pro for Victory Ninja Shoes" indications), a team window 212 is displayed. In one or more embodiments, the team window 212 includes indications of the members of a team. In the illustrated example, the team window 212 includes indications of five members (e.g., "Mathew S.", "Nina M.", "Mark O'Hara", "Pascal Roy", and "Henry D. Souza") of a team having the name "Tiger Ad Team". With the P&A selection window 206 and the team window 212, an administrative member of a team can assign project assets and preferences to individual members of a team and to an entirety of a team.

By way of example, an administrative member can assign an asset or preference solely to Nina M. without assigning the asset or preference to other members of the Tiger Ad Team. Alternately, the administrative member can assign the asset or preference to each of the members of the Tiger Ad Team. To do so, the administrative member may simply select a preference or asset from the P&A selection window 206, drag the selected preference or asset to the team window 212, and drop the selected asset on a portion of the team window 212 that corresponds to an individual member of the team or to the team as a whole. In other words an administrative member may assign an asset or preference to a team or its members using drag-and-drop functionality.

As discussed above, the admin sharing module 118 represents functionality to generate the admin user interface. Thus, the admin sharing module 118 represents functionality to generate the instances of the admin user interface depicted in FIGS. 3 and 4. By way of example, the admin sharing module 118 generates the instances of the admin user interface using the project assets 120 and the project preferences 122. As noted above, the admin sharing module 118 receives this data by way of communication over the network 116 from the project sharing module 114 of the service provider 102.

In one or more embodiments, an administrative member makes a selection via the admin user interface to launch a window for assigning project assets or preferences. Responsive to such a selection, the admin sharing module 118 generates a request for communication to the service provider 102 to populate the admin user interface so that such assignments can be made. The admin sharing module 118 then causes the generated request to be communicated to the service provider 102 over the network 116. The project sharing module 114 receives the request and responds thereto. To do so, the project sharing module 114 generates one or more responses for communication back to the admin sharing module 118. The responses are formed to include at least some of the project data 112 maintained at the service provider 102. In particular, the responses are formed to include information about the teams, team members, project assets, and project preferences over which the requesting administrative member is allowed to exercise administrative control. This information includes the project assets 120 and project preferences 122 illustrated in the admin sharing module 118. Based on assignments made by an administrative member, the admin sharing module 118 and the project sharing module 114 may interact (e.g., though communications made over the network 116) to update the project data 112 to indicate assignment of project assets and preferences to team members.

FIG. 3 depicts at 300 the user interface of FIG. 2, and depicts an example in which operations are performed by an administrative member to assign a project preference and project asset for sharing with a selected team. FIG. 3 includes a third instance 302 and a fourth instance 304 of the admin user interface. Both the third instance 302 and the fourth instance 304 include the P&A selection window 206 and the team window 212. Thus, the third and fourth instances, 302 and 304 respectively, represent scenarios in which an administrative member has already selected a team for asset and preference assignment from the team selection window 208. In particular, FIG. 3 illustrates scenarios in which the administrative member has selected the "Tiger Ad Team" for asset and preference assignment.

The third instance 302 represents a scenario in which a project preference is assigned to a team (e.g., the Tiger Ad Team). The third instance 302 of the admin user interface is illustrated with a preferences portion 306 of the P&A selection window 206 being open and an assets portion 308 being closed. When the preferences portion 306 is open, indications of assignable preferences are presented therein. In the third instance 302, indications of the preferences "Design Tool en_GB Super settings" and "Photoeditor Megacorp settings" are presented in the open preferences portion 306. Further, preference indications are selectable from the preferences portion 306 for assignment to the team (or one or more of its members) presented in the team window 212.

In the example illustrated by the third instance 302, the "Design Tool en_GB Super settings" preference is being assigned to the Tiger Ad Team. The act of assigning the "Design Tool en_GB Super settings" preference is represented by depiction of the cursor 210 over the preference indication in the preferences portion 306. It is also represented by the depiction of the cursor 210 holding a selected-preference indication 310 over the team window 212 and a dashed line 312 that connects the depictions of the cursor 210. In particular, the two depictions of the cursor 210, the dashed line 312, and the selected-preference indication 310 indicate assignment of the preference "Design Tool en_GB Super settings" to the Tiger Ad Team using drag-and-drop functionality.

To assign this particular preference to the Tiger Ad Team, for example, an administrative member may select the "Design Tool en_GB Super settings" indication from the preferences portion 306, e.g., by pressing down on a left mouse button when the cursor 210 is positioned over the indication, by touching a finger or stylus to an area of a display proximate the indication, and so on. Once an indication is selected, it may pop out and be presented on the user interface as the selected-preference indication 310. The administrative member may then drag the selected-preference indication 310 along a path indicated by the dashed line 312 to the team window 212, e.g., by moving a mouse to position the cursor 210 over the team window 212, by moving the finger or stylus to an area of the display corresponding to the team window 212, and so on. Once the selected-preference indication 310 is over the team window 212 the administrative member may drop the indication therein, e.g., by releasing the left mouse button, lifting the finger or stylus off of the display, and so on. It should be noted that the dashed line 312 is included in the example merely to illustrate the "dragging" performed to assign preferences. The dashed line 312 is not included when the admin user interface is displayed. As discussed above, the cursor 210 may be displayed in some but not every embodiment. By way of example, the cursor 210 may be displayed when the admin computing device 104 is connected to a mouse, but not when the admin computing device 104 receives input solely through touch functionality.

The fourth instance 304 represents a scenario in which a project asset is assigned to a team (e.g., the Tiger Ad Team). In contrast to the third instance 302, the fourth instance 304 is illustrated with the preferences portion 306 being closed and the assets portion 308 of the P&A selection window 206 being open. When the assets portion 308 is open, indications of assignable assets are presented therein. In the fourth instance 304, indications of the assets "Apple" and "Whitehouse" are presented in the open assets portion 308. Further, asset indications are selectable from the assets portion 308 for assignment to the team (or one or more of its members) presented in the team window 212.

In the example illustrated by the fourth instance 304, the "Apple" asset is being assigned to the Tiger Ad Team. The act of assigning the "Apple" asset is represented by depiction of the cursor 210 over the asset indication in the assets portion 308. It is also represented by the depiction of the cursor 210 holding a selected-asset indication 314 over the team window 212 and a dashed line 316 that connects the depictions of the cursor 210. In particular, the two depictions of the cursor 210, the dashed line 316, and the selected-asset indication 314 indicate assignment of the asset "Apple" to the Tiger Ad Team using drag-and-drop functionality.

To assign this particular asset to the Tiger Ad Team, for example, an administrative member may select the "Apple" indication from the assets portion 308, e.g., by pressing down on a left mouse button when the cursor 210 is positioned over the indication, by touching a finger or stylus to an area of a display proximate the indication, and so on. Once an indication is selected, it may pop out and be presented on the user interface as the selected-asset indication 314. The administrative member may then drag the selected-asset indication 314 along a path indicated by the dashed line 316 to the team window 212, e.g., by moving a mouse to position the cursor 210 over the team window 212, by moving the finger or stylus to an area of the display corresponding to the team window 212, and so on. Once the selected-asset indication 314 is over the team window 212 the administrative member may drop the indication therein, e.g., by releasing the left mouse button, lifting the finger or stylus off of the display, and so on. It should be noted that the dashed line 316 is included in the example merely to illustrate the "dragging" performed to assign assets. The dashed line 316 is not included when the admin user interface is displayed. As discussed above, the cursor 210 may be displayed in some but not every embodiment. Furthermore, preferences and assets may be assigned to teams and members of teams via an admin user interface in other ways without departing from the spirit or scope of the techniques described herein.

Responsive to input to assign an asset or preference to a member of a team or to an entire team, the admin sharing module 118 generates a request for communication that indicates the assignment. These requests include, for example, an indication of the assets or preferences to be assigned and an identifier of the content project associated with the assignment. In conjunction with the examples illustrated in FIG. 3, for instance, the admin sharing module 118 generates one or more requests to assign the "Design Tool en_GB Super settings" preference and the "Apple" asset to the Tiger Ad Team. The project identifier may correspond to a project worked on by the Tiger Ad Team. The admin sharing module 118 is configured to cause these requests to be communicated over the network 116 to the service provider 102 for processing by the project sharing module 114.

As part of assigning project assets and preferences, the project sharing module 114 creates a folder for a corresponding team. To this folder, the project sharing module 114 copies the original assets and preferences for the team. By way of example, the folder may have the following structure: "<base_url>/<team_name>/<date-time-stamp>/ . . . ." The project sharing module 114 is also configured to create subfolders beneath this folder for the assigned assets and preferences. For an asset that corresponds to a brush, for instance, the project sharing module 114 creates a folder with a structure that appends "assets/brush" to the above-noted structure. A particular asset or preference may then be made accessible through a uniform resource identifier (URI) that specifies the folder structure and name of the particular asset or preference.

To assign a project asset or preference, the project sharing module 114 is configured to execute an assignment algorithm for each of the team members to which the project asset or preference is assigned as follows. The project sharing module 114 ascertains a list of the teams to which a given member belongs, e.g., by searching through the project data 112. Given the list of teams for the given member, the project sharing module 114 then searches through the assets and preferences of each team on the list. The project sharing module 114 checks the assets and preferences of those teams to determine whether they are associated with the project identifier, which as discussed above is included in requests to assign project assets and preferences. In other words, the project sharing module 114 uses the project identifier to identify project assets and preferences associated with a particular project from among the project assets and preferences associated with each of the teams on the list for the given member.

Once the project assets and preferences associated with the particular project are identified, the project sharing module 114 generates a response for communication to the member to which the project asset or preference is assigned. Responses to the assignment requests include indications of the assigned project assets and preferences. By way of example, the project sharing module 114 configures the responses to include URIs for each of the project assets and preferences that are to be made accessible to the particular member. The URIs included combine the name of the project team for which the asset or preference is assigned and a name of the assigned asset or preference.

With regard to the example in FIG. 3, in which the "Design Tool en_GB Super settings" preference is assigned to the Tiger Ad Team, a URI included in a response for this assignment may be formatted as follows: "https://megacorp.com/us/team/tiger-ad-team/201501022034/preferences/Design_Tool en_GB_Super_settings.config" In this URI, "megacorp.com/us/team" represents the "<base_url>" component discussed above with reference to the folder structure, "tiger-ad-team" represents the "<team_name>" component, "201501022034" represents the "<date-timestamp>" component, and "preferences" indicates a subfolder into which a file for implementing the "Design Tool en_GB Super settings" preferences are copied, e.g., a file with the name "Design_Tool en_GB_Super_settings.config".

In the ongoing example, the project sharing module 114 causes the generated response to be communicated to the member for which the response is generated. The member computing device 106 represents the member for which the response is generated. Accordingly, the project sharing module 114 causes a response with indications of the assets and preferences that are associated with a particular project to be communicated over the network 116 to the member computing device 106.

The member sharing module 124 is configured to process the response to enable access to the project assets and preferences indicated in the response. Once the assignment response is received by the member sharing module 124, it can generate a non-administrative member user interface for previewing and applying the project assets and preferences indicated in the response.

Figure 4:
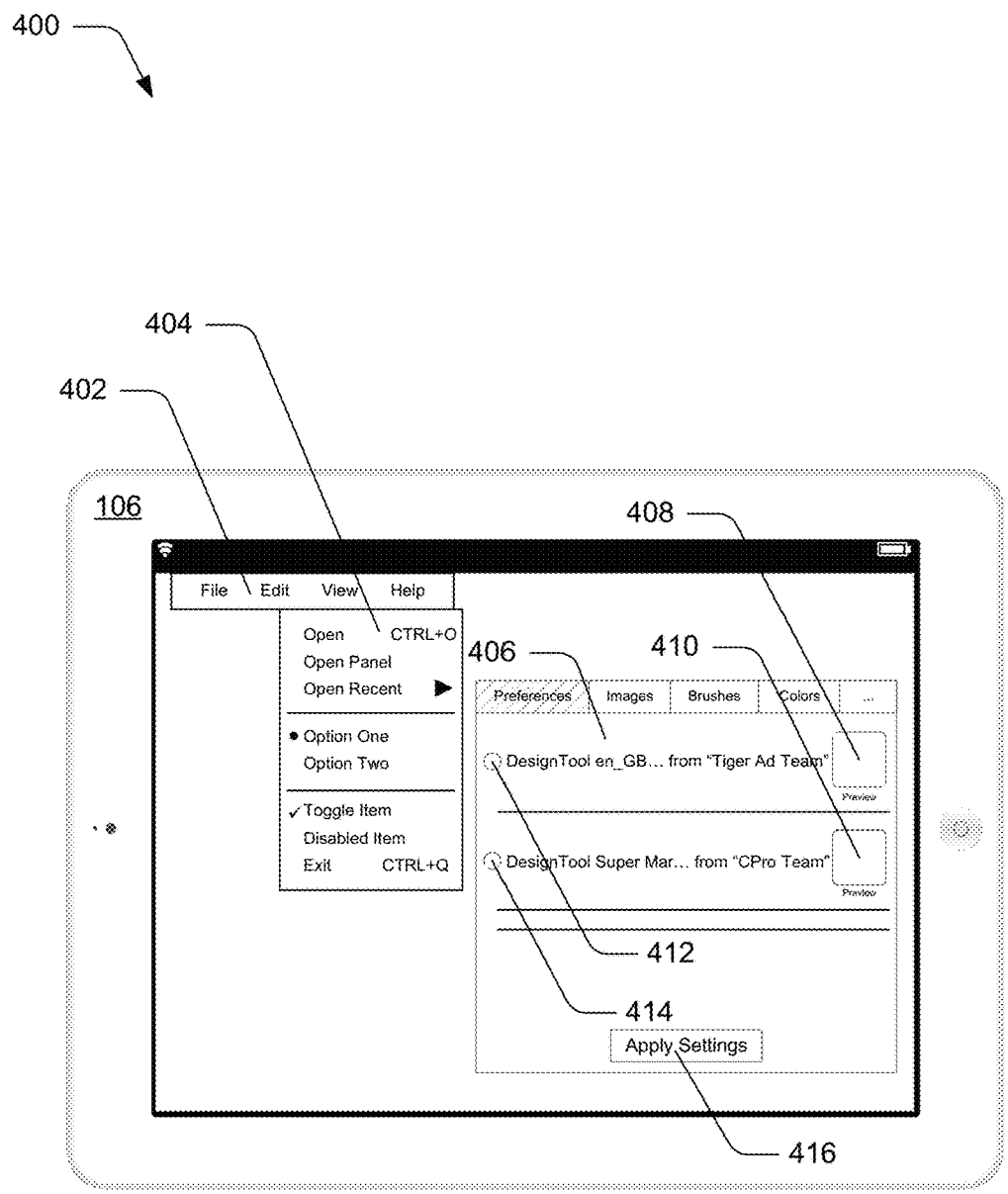
FIG. 4 is an example embodiment showing a user interface that enables a member of a team to preview and apply project preferences and assets assigned to the member.

FIG. 4 depicts at 400 an example user interface that enables a member of a content project team to preview and apply project preferences and assets assigned to the member. The user interface depicted at 400 thus represents the "non-administrative member user interface" mentioned above, which is distinguishable from the "admin user interface". The non-administrative member user interface is displayable by the member computing device 106. The non-administrative member user interface can be displayed at the member computing device 106 in response to a menu selection in a content-creation application to view project assets and preferences assigned to the member, for example. In contrast to the admin user interface, however, the non-administrative member user interface does not allow the member to assign project assets and preferences.

In particular, the user interface at 400 includes menus 402 and 404 as well as preferences and assets dialog 406 ("P&A dialog 406"). By way of example, the menus 402 and 404 may correspond to menus of a content-creation application that the member can use to modify a content project, such as a photo or image editing application, an audio editing application, a video editing application, a word processing application, an interface for a suite of such applications, and so on. From the menus 402 and 404, a member associated with the member computing device 106 may select to view the assets and preferences that have been assigned to the member. With reference to the illustrated example, the member may select the "Open Recent" menu item of menu 404 to view the assets and preferences assigned to the member.

The P&A dialog 406 is illustrated having two preferences assigned to the member, e.g., the "Design Tool en_GB . . . " preference and the "Design Tool Super Mar . . . " preference. The P&A dialog 406 is also illustrated with previews 408, 410. In the illustrated example, the preview 408 corresponds to the "Design Tool en_GB . . . " preference and the preview 410 corresponds to the "Design Tool Super Mar . . . " preference. The preview 408 allows a member to preview the "Design Tool en_GB . . . " preference, or the effects thereof, prior to applying that preference. Likewise, the preview 410 allows a member to preview the "Design Tool Super Mar . . . " preference, or the effects thereof, prior to applying that preference.

In addition to the previews 408, 410, the P&A dialog 406 also includes preference selection buttons 412, 414, which in this example are depicted as radio buttons. In the illustrated example, the preference selection button 412 corresponds to the "Design Tool en_GB . . . " preference and the preference selection button 414 corresponds to the "Design Tool Super Mar . . . " preference. The preference selection button 412 represents functionality to allow the member to make a selection to have the "Design Tool en_GB . . . " preference applied. Similarly, the preference selection button 414 represents functionality to allow the member to make a selection to have the "Design Tool Super Mar . . . " preference applied.

Consider an example in which the member selects the preference selection button 412 and then selects apply settings button 416. As a result of doing so, the member sharing module 124 applies the "Design Tool en_GB . . . " preference to a corresponding project or to one or more applications used to modify that project. The member may also select the preference selection button 414 and then the apply settings button 416. In response to these actions of the member, the member sharing module 124 applies the "Design Tool Super Mar . . . " preference to a corresponding project or to one or more applications used to modify that project.

In addition to preference names, the P&A dialog 406 also includes indications of teams with which the preferences are associated. For example, there is an indication next to the "Design Tool en_GB . . . " preference that indicates it is associated with the Tiger Ad Team and there is an indication next to the "Design Tool Super Mar . . . " preference that indicates it is associated with the CPro Team. These team indications represent functionality to limit use of the preferences and assets assigned to a member to projects for which the preferences and assets are assigned. By way of example, the member sharing module 124 may allow the member to access a given asset or preference solely when working on the project for which the asset or preference is assigned. When the member works on a different project, the member sharing module 124 prevents the member from accessing the given asset or preference.

With reference to the example of FIG. 4, the member sharing module 124 may allow a member to access the "Design Tool en_GB . . . " preference when working on a content project associated with the Tiger Ad Team. However, the member sharing module 124 prevents the member from accessing the "Design Tool en_GB . . . " preference when working on any other projects, e.g., a project associated with the CPro Team or some individual content project. In a similar manner, the member sharing module 124 may allow a member to access the "Design Tool Super Mar . . . " preference when working on a content project associated with the CPro Team. However, the member sharing module 124 prevents the member from accessing the "Design Tool Super Mar . . . " preference when working on any other projects, e.g., a project associated with the Tiger Ad Team or some individual content project.

In one or more embodiments, the member sharing module 124 is implemented as part of the content-creation applications that the member can use to create and edit content. Thus the functionality to control access to project preferences and assets, so that the preferences and assets are used just for the projects for which they were assigned, may be carried out by the content-creation applications. By limiting use of assigned preferences and assets to the projects for which they are assigned, the techniques described herein address concerns that a project preference or asset developed by a team or organization can be disseminated to an entity that has not been given permission or been licensed to use the preference or asset.

Additionally, the P&A dialog 406 is illustrated with multiple tabs, e.g., a preferences tab 418, an images tab 420, a brushes tab 422, a colors tab 424, and a more tab 426. The preferences tab 418 has a hashed background to indicate that it is the active tab of the P&A dialog 406. The information displayed in the P&A dialog 406 corresponds to that of the active tab. Since the preferences tab 418 is the active tab, preferences assigned to the member (e.g., the "Design Tool en_GB . . . " preference and the "Design Tool Super Mar . . . " preference) are displayed for preview and selection to have them applied. When an asset tab, such as the images tab 420, the brushes tab 422, or the colors tab 424, is the active tab, corresponding assets assigned to the member are displayed for preview and selection to have them applied. When the images tab 420 is the active tab, for instance, any images assigned to the member may be displayed for preview and for selection to apply the images. The more tab 426 represent other preferences and assets that can be assigned to a member using the techniques herein. By way of example and not limitation, other preferences and assets can include settings to impart themes on content-creation applications, settings to add metadata (e.g., project name, author(s), company, credits, and so on) to the project, audio filters, sound bites, audio tracks (e.g., that can be included as part of a larger audio track, a video clip, and so on), video filters, video clips, and so forth.

It should be appreciated that the user interface illustrated in FIG. 4 is just one example of a non-administrative member user interface that can be displayed to a member to enable the member to preview and apply assigned project assets and preferences. A non-administrative member user interface may be configured in a variety of different ways to allow a member to preview project preferences and assets and select to apply them for use in conjunction with a content project. Further, a non-administrative member user interface may be generated for display in response to actions other than selection by the member to do so. By way of example, the non-administrative member user interface may be displayed automatically once a response from the service provider 102, which indicates that project assets or preferences are to be assigned to the member, is received at the member computing device 106.

Regardless of how the non-administrative member user interface is configured, the member sharing module 124 is configured to initiate download of data that enables access to a project preference or asset. The member sharing module 124 may initiate download of such data, for instance, once the member has selected to apply the project preference or asset via the non-administrative member user interface. Further, the member sharing module 124 may download the data for a project asset or preference using the URI that corresponds to the project preference or asset, e.g., that was included in the assignment response from the service provider 102. Once data indicative of a project preference or asset is downloaded to the member computing device 106, the project preference or asset can be applied or accessed. Consider an example in which data for a theme is downloaded. The data enables the member sharing module 124 to apply the theme so that a next time a content-creation application is opened to modify content of the associated project, the content-creation application is configured with the theme. In an example in which data for a brush is downloaded, the member sharing module 124 can make the brush available to the member a next time the content-creation application is opened by the member to modify the content project.

In addition to enabling access to assigned project preferences and assets, the techniques described herein also involve retracting that access. Access to a project preference or asset may be retracted from a member, for example, when the member leaves the team or is removed from the team to which the project asset or preference corresponds. In one or more embodiments, a project preference or asset may be assigned for a limited amount of time, e.g., the admin user interface may allow an administrative member to select a window of time during which the project preference or asset is to be made available to the member. In this case, access may be retracted when the time period expires. In addition or alternately, the admin user interface may include functionality that allows an administrative member to select to retract access to a project asset or preference assigned to a member, e.g., the admin user interface may enable an administrative member to retract preference or asset access from individual members or from an entire team. In this case, the admin sharing module 118 is configured to generate a request for communication to the service provider 102 to retract access to project preferences or assets specified by the administrative member's selection. The project sharing module 114 processes the retraction request and generates a response to the request for communication to the member computing device 106. The project sharing module 114 then communicates the retraction response to the member computing device 106 where it is processed by the member sharing module 124.

To retract access to assigned project assets and preferences, the member sharing module 124 is configured to delete the downloaded data that enables the access. Additionally, the member sharing module 124 is configured to restore settings of content-creation applications that were changed to apply the preferences or enable the assets to be used. In other words, the member sharing module 124 makes the retracted preferences and assets unavailable and removes any artifacts that result from their application. The member sharing module 124 may perform these tasks to "clean up" the member computing device 106 responsive to receiving a request to do so from the project sharing module 114, responsive to expiration of a time that the member is allowed to access the project assets and settings, when the member is determined to have left the team, at an end date of the project for which the project assets and settings are applied, and so on.

In one or more embodiments, access to project assets and preferences may be associated with the member being logged in to a project. For example, when a member logs into a project, access to the project's assets and preferences that are assigned to the member may be given, e.g., the data for the assigned assets and preferences is downloaded responsive to the member logging in. In a similar manner, access to those assets and preferences may be retracted when the member logs out of the project, e.g., the data for the assigned assets and preferences that was downloaded, is deleted and settings of the content-creation applications restored.

Having discussed example details of the project asset and preference sharing techniques, consider now some example procedures to illustrate additional aspects of the techniques.

Example Procedures

This section describes example procedures for project asset and preference sharing techniques in one or more embodiments. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed by a suitably configured device, such as example service provider 102 of FIG. 1 that makes use of a project sharing module 114, or example admin computing device 104 or example member computing device 106, that make use of an admin sharing module 118 and member sharing module 124, respectively.

FIG. 5 depicts an example procedure 500 in which a request to assign a project asset or preference to a member of a team is processed to enable the member to access the assigned project asset or preference. First, the request is received to assign the project asset or preference to the member of the team (block 502). The received request includes a project identifier for which the project asset or preference will be assigned. For example, the project sharing service implemented by the project sharing module 114 receives a request that includes an indication of the asset or preference to be assigned as well as an identifier of the project for which the asset or preference is assigned. The request may be received over the network 116 from the admin computing device 104 responsive to a selection made by an administrative member of a project team to assign the preference or asset to the member for the project.

To assign a project asset or preference specified in a request to a member, a list of teams to which the member belongs is ascertained (block 504). For example, the project sharing module 114 ascertains a list of teams to which the member belongs from the project data 112.

Once the list of teams to which the member belongs is ascertained, assets and preferences associated with the teams on the list are checked to identify, using the identifier, the project assets and preferences associated with the project (block 506). For example, the project sharing module 114 searches through the assets and preferences associated with the teams ascertained at block 504 for the identifier included as part of the request received at block 502. To identify the project assets and preferences associated with the project, the project sharing module 114 checks an identifier of each asset or preference associated with the teams on the list. Assets and preferences associated with teams not on the list are not checked. If the identifier of an asset or preference matches the project identifier included in the request, then the asset or preference is identified as being associated with the project of interest.

A response is then generated for communication to the member that includes indications of the identified project assets and preferences (block 508). The identifiers included in the response enable the member to access the identified project assets and preferences. For example, the project sharing module 114 generates a response for communication to the member based on the project assets and preferences identified at block 506. In particular, the project sharing module configures the response to include indications of the identified project assets and preferences. The indications of the project assets and preferences included in the response may be uniform resource identifiers (URIs) that enable access to data indicative of assigned project assets and preferences. Such URIs enable members to access their assigned project assets and preferences because they provide a location from which data indicative of those project assets and preferences can be downloaded, e.g., by a content-creation application that is usable to modify content of the project.

Figure 6:
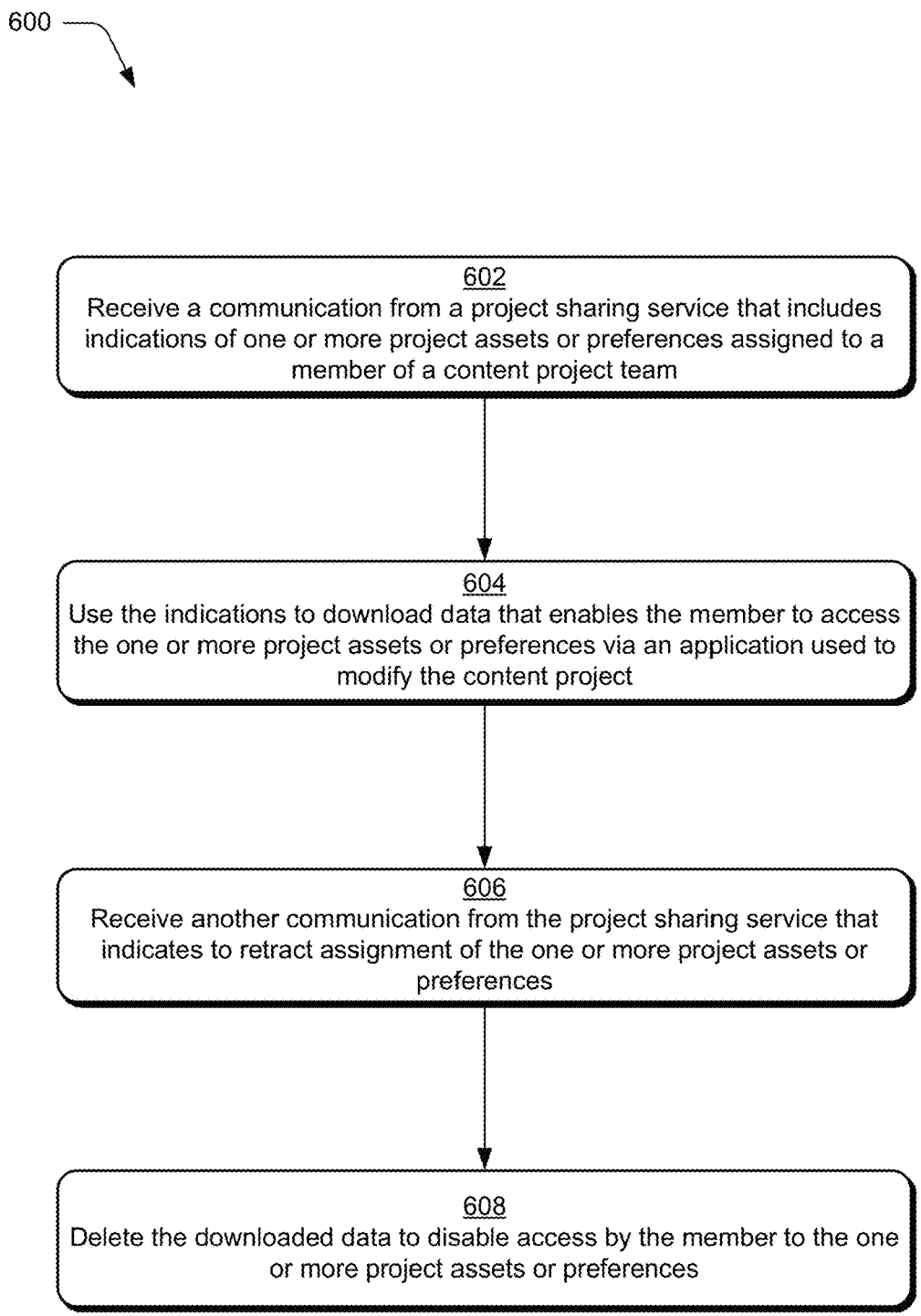
FIG. 6 is a flow diagram depicting another example procedure in accordance with one or more embodiments.

FIG. 6 depicts an example procedure 600 in which assigned project assets and preferences are made accessible for use by a member of a content project team. A communication for a member of a content project team is received from a project sharing service (block 602). The communication includes indications of project assets and preferences that are assigned to the member of the content project team. For example, the member sharing module 124 receives a communication from the project sharing module, e.g., the response generated by the project sharing module 114 at block 508. In one or more embodiments, the indications of the project assets and preferences assigned to the member are URIs configured as discussed in detail above.

The indications included in the communication are used to download data that enables the member to access the project assets or preferences via an application used to modify the content project (block 604). For example, the member sharing module 124 uses the indications to locate data indicative of the preferences and assets assigned to the member. As discussed above, the data indicative of the preferences and assets assigned to the member may be located at the service provider 102, e.g., it is maintained at the service provider 102 by the project sharing service. Accordingly, the member sharing module 124 interacts with the project sharing module 114 to download this data over the network 116 to the member computing device 106.

Once downloaded, the member sharing module 124 makes the data accessible to or applies it to corresponding content-creation applications. By way of example, the member sharing module 124 makes a brush available to image and photo editing applications and makes an audio filter available to audio editing applications. The member sharing module 124 applies preferences to corresponding content-creation applications and information associated with a project in a similar manner. In this way, once the project assets and preferences have been made available or applied, they may be used by the member to modify content of the project. For instance, a shared brush may be used by the member to make brush strokes in a digital painting and thus to modify the painting.

Another communication is received from the project sharing module which indicates that the assignment of the project assets or preferences to the member is to be retracted (block 606). For example, the member sharing module 124 receives another communication from the project sharing module 114 that indicates the member's access to the project assets and preferences has been retracted. This communication can be received based on a request made by an administrative member of the member's team to retract the access of the member to the asset or preference. The administrative member of the team can make this request via an admin user interface that allows the project assets and preferences to be assigned to members of a team and allows assignments to be retracted. The admin user interface can also allow an administrative member to set an amount of time that the project assets and preference are to be made accessible to a user. In such a scenario, the other communication may be received in response to an expiration of the time.

The data that is downloaded to enable access by the member to the project assets or preferences is deleted to disable the access (block 608). For example, the member sharing module 124 deletes the data that was downloaded at block 604. The member sharing module 124 also returns any settings that it changed in content-creation applications when enabling access to or application of the assigned project preferences and assets. In other words, the member sharing module 124 cleans data from the member computing device 106 so that the project assets and settings can no longer be accessed by the member.

Having described example procedures in accordance with one or more embodiments, consider now an implementation example of the various techniques described herein.

Implementation Example

Figure 7:
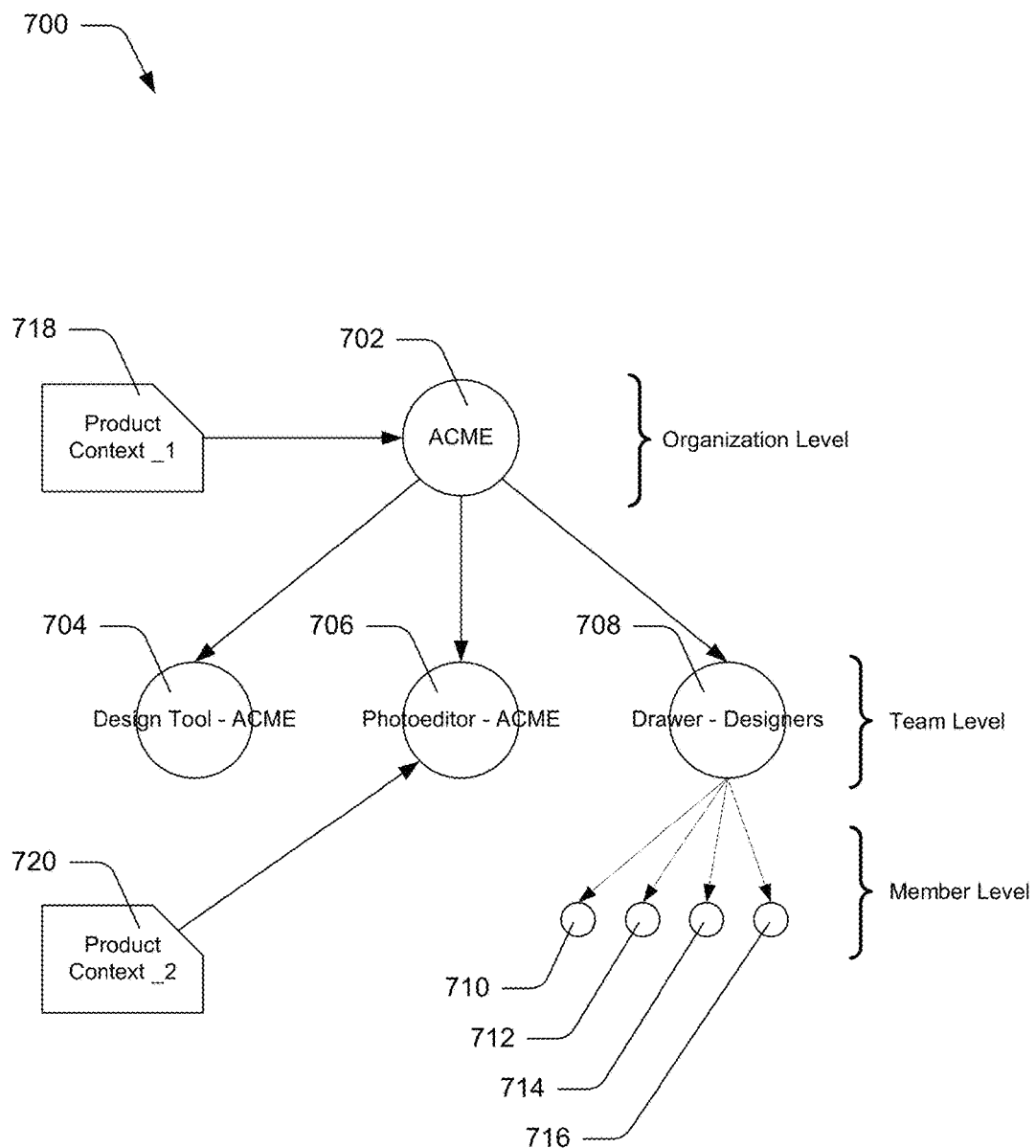
FIG. 7 is an illustration of an organizational hierarchy in an implementation example that is traversed to assign project preferences and assets to members in the organization.

This section describes an implementation example of project asset and preference sharing techniques in accordance with one or more embodiments. FIG. 7 depicts an illustration of an organizational hierarchy 700 in an implementation example that is traversed to assign project preferences and assets to members in the organization. The illustrated organizational hierarchy 700 includes a top-level organization 702 named "ACME". Under the top-level organization 702, the organizational hierarchy 700 includes teams 704, 706, 708, named "Design Tool-ACME", "Photoeditor-ACME", and "Drawer-Designers", respectively. The organizational hierarchy 700 also includes members 710, 712, 714, 716. The members 710, 712, 714, 716 are illustrated as being team members of the Drawer-Designers Team, which is illustrated by the arrows connecting them to the team 708. It is to be appreciated though that the members 710, 712, 714, 716 represent members of the organization to which assets and preferences of the organization can be assigned and from which assignment can be retracted. Accordingly, the members 710, 712, 714, 716 can be members of multiple teams of the top-level organization 702.

FIG. 7 also includes product contexts 718, 720. Product context 718 represents a product context that is assigned at an organization level and product context 720 represents a product context that is assigned at a team level. Generally, product contexts are generated once an asset or preference is assigned. By way of example, the project sharing module 114 creates the product context 720 when an administrative member of the Photoeditor-ACME team assigns assets and preferences to the team 706. In one or more embodiments, the project sharing module 114 generates the product context 720 as follows:

```
["product_context" :{
"type" : "asset",
"product_ident" : "IDS",
"url" : "/DesignTool-ACME/20150101223223/",
"name" : "designtool_pref_acme",
"images" : "/images",
"brush": "/cbr",
"pref_set" : "/prefs"}]
```

Here, the term "product_ident" represents a code that identifies the product and is a three- or four-character string, e.g., an SAP code. In addition to creating project contexts in this way, the project sharing module 114 in conjunction therewith also creates a corresponding folder structure as discussed in more detail above.

Figure 8:
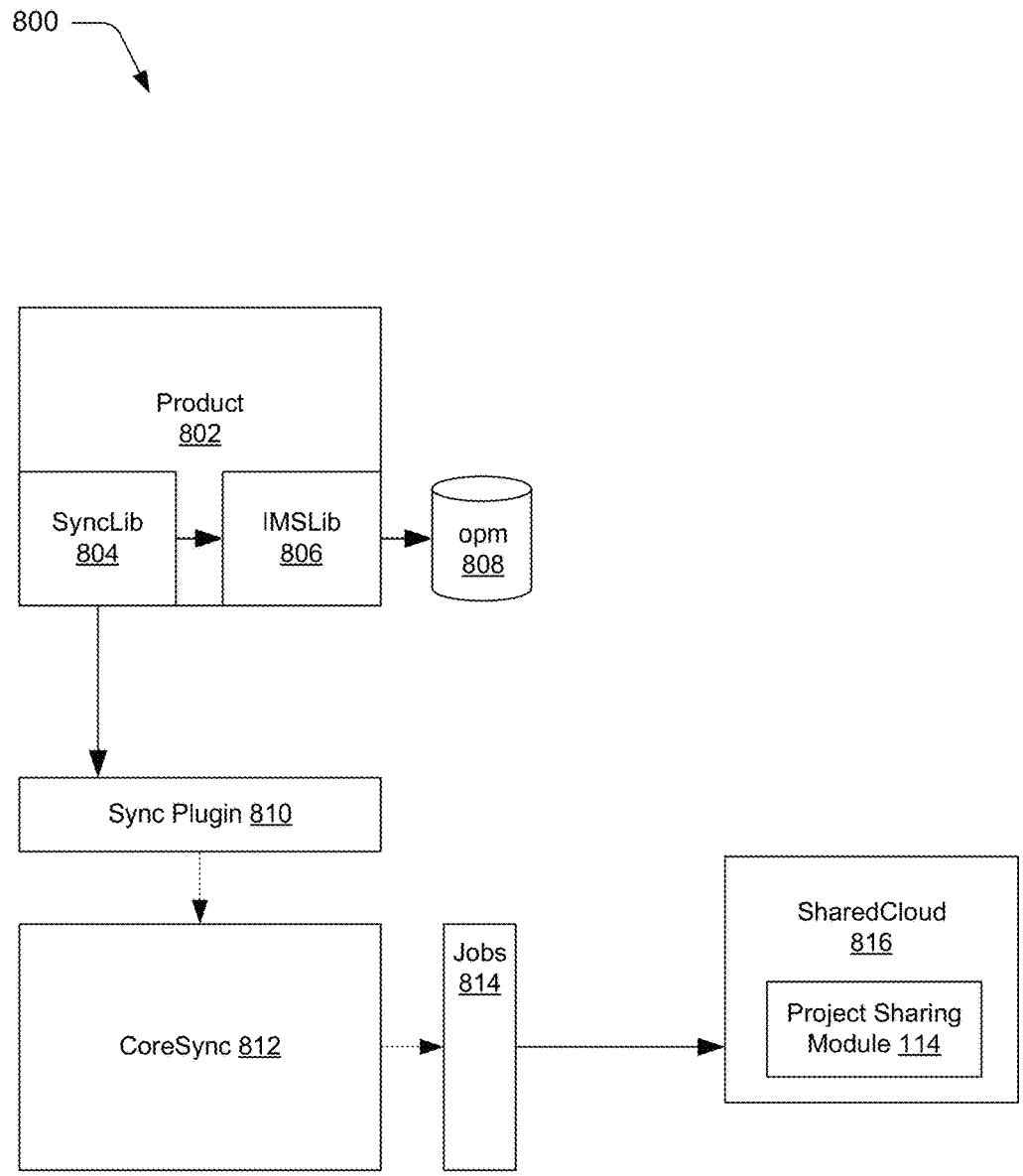
FIG. 8 is an implementation example depicting components of FIG. 1 and interactions of those components with other components of the implementation example.

FIG. 8 depicts generally at 800 an implementation example in which components of FIG. 1 interact with other components of the implementation example. In particular, FIG. 8 includes the project sharing module 114 of FIG. 1 and represents interaction of the components in the implementation example with the project sharing module 114. FIG. 8 includes product 802 which represents a creative project that can be produced by content-creation applications. The product 802 is illustrated having SyncLib 804 and IMSLib 806. SyncLib 804 represents a C++ native library that can be incorporated into content-creation applications of team members to download and upload preference settings. IMSLib 806 represents a C++ library that can be used to perform single sign-on (SSO) for team members across the content creation applications. FIG. 8 also includes opm database 808, which represents a repository that maintains an indication of the team members who have signed in to the content-creation applications and tokens of the client devices via which the members have signed in.

In addition, the implementation example at 800 includes Sync Plugin 810, CoreSync 812, and jobs 814. The Sync Plugin 810 represents an application plugin that runs under CoreSync 812. CoreSync 812 is representative of a system-level local service that synchronizes files between SharedCloud 816 and the client devices used by members of the project teams. The files synchronized correspond to those that enable the team members to have access to assigned assets and preferences. Such synchronization also involves removal of files from client devices of the members when their access to the assets and preferences is retracted. The jobs 814 represent operations performed to synchronize the files between the SharedCloud 816 and the client devices.

The SharedCloud 816 represents an example of a service that manages storage for content projects. As discussed above, such services can maintain the assets and preferences for a project as well as other data associated with the project, such as team members working on the project, assignments of assets and preferences to the team members, and so on. The SharedCloud is illustrated having the project sharing module 114 which effectuates the assignment of assets and preferences to members of a project team as discussed above.

Having described an implementation example in accordance with one or more embodiments, consider now an example system and device that can be utilized to implement the various techniques described herein.

Example System and Device

Figure 9:
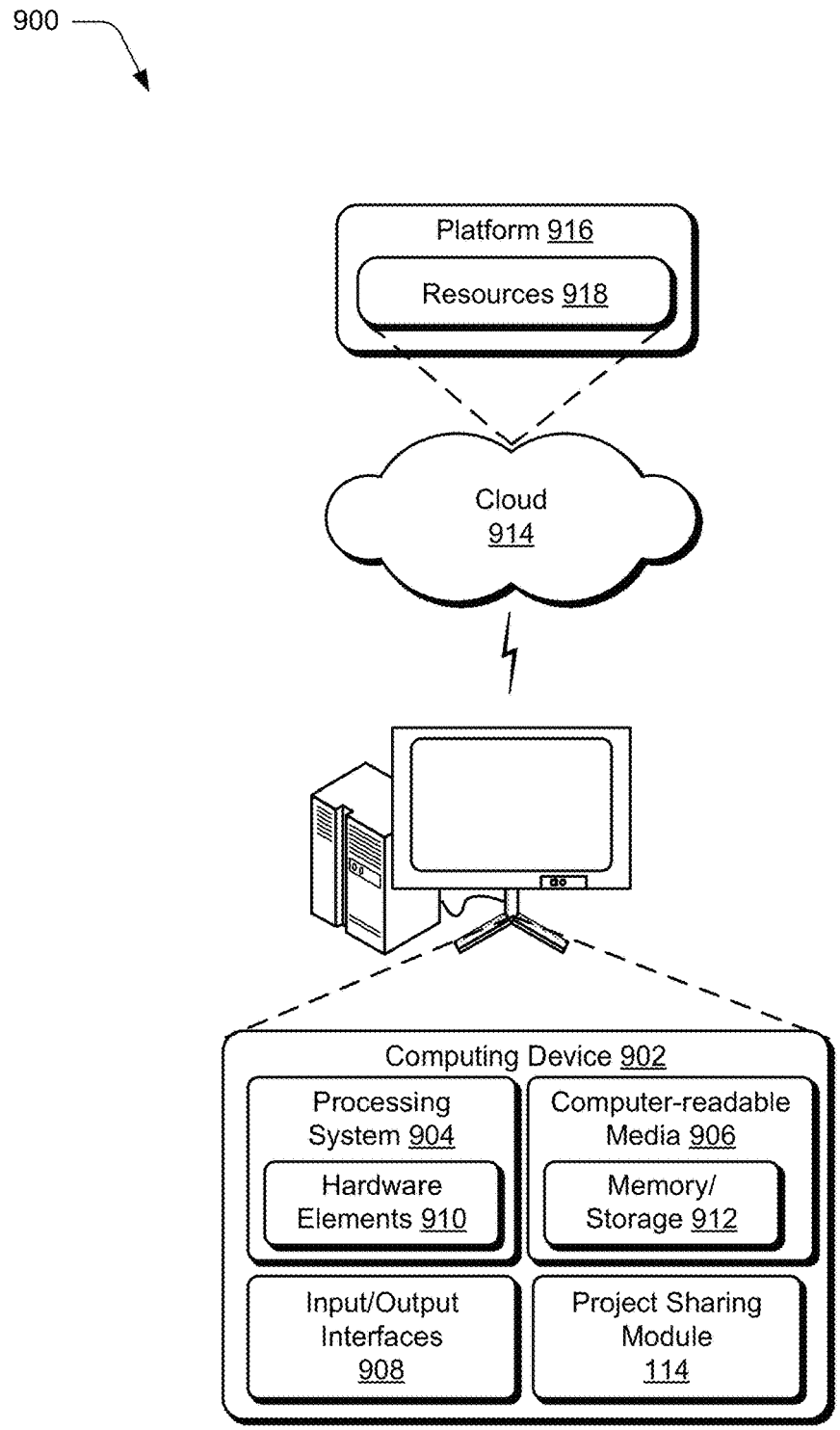
FIG. 9 illustrates an example system including various components of an example device that can be employed for one or more embodiments of the project asset and preference sharing described herein.

FIG. 9 illustrates an example system generally at 900 that includes an example computing device 902 that is representative of one or more computing systems and/or devices that may implement the various techniques described herein. This is illustrated through inclusion of the project sharing module 114, which operates as described above. The computing device 902 may be, for example, a server of a service provider, a device associated with a client (e.g., a client device), an on-chip system, and/or any other suitable computing device or computing system.

The example computing device 902 includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital environment in which members of teams collaborate on digital content projects, a method of sharing project assets and preferences with members of a team by at least one computing device, the method comprising:

receiving, by the at least one computing device, a request to assign a project asset and a project preference to a selected member of the team, the request including an identifier of a project associated with assignment of the project asset and the project preference, the project asset comprising a created content item or tool for content creation that is usable by the selected member to modify the project, and the project preference comprising a setting to configure an application used to modify the project;

ascertaining, by the at least one computing device, a list of teams to which the selected member belongs;

checking, by the at least one computing device, assets and preferences associated with the teams on the list to identify, using the identifier, the project assets and preferences of the project that are assigned to the selected member;

generating, by the at least one computing device, a response for communication to a device associated with the selected member that includes indications of the identified project assets and preferences, the indications enabling the device associated with the selected member to download access data the application uses to surface the identified project assets and preferences in connection with modifying the project, including surfacing the project asset and the project preference assigned to the selected member according to the received request; and communicating the response to the device associated with the selected member, the response causing the device associated with the selected member to generate a user interface, the user interface having options that are selectable by the selected member to surface the identified project assets and preferences via the application for use in modifying the project.

2. A method as described in claim 1, further comprising combining a name of the team and names of the identified project assets and preferences to form the indications.

3. A method as described in claim 1, wherein the indications each comprise a uniform resource identifier (URI) that enables the device associated with the selected member to download the access data for a corresponding project asset or preference via the application.

4. A method as described in claim 1, wherein the response is configured to enable the user interface to present previews of the identified project assets and preferences to the selected member.

5. A method as described in claim 1, wherein the request is received from an administrative member associated with the team via an admin user interface that allows the administrative member to assign the project assets and preferences to the members of the team.

6. A method as described in claim 1, wherein non-administrative user interfaces presented to non-administrative members of the team do not allow the non-administrative members to assign the project assets and preferences.

7. A method as described in claim 1, further comprising:
receiving a subsequent request to retract assignment of the project asset or the project preference; and
causing access of the selected member to the project asset or the project preference to be disabled by deleting the downloaded access data.

8. A method as described in claim 1, wherein the assigned project asset comprises one of an image, a brush, or a color.

9. A method as described in claim 1, wherein the assigned project preference causes at least a portion of the application to be configured with a theme.

10. In a digital environment in which members of teams collaborate on digital content projects, a system to enable project assets and preferences to be shared with members of a team, the system comprising:

one or more processors; and a memory comprising computer-readable instructions that are executable by the one or more processors to implement a project sharing service to perform operations comprising:

maintaining project data indicative of project assets and project preferences that are associated with content projects, the project data used to generate a user interface that enables an administrative member of a particular team to assign the project assets and the project preferences associated with a content project of the particular team to other members of the particular team, the project assets comprising a created content item or tool for content creation that is usable to modify the content project, and the project preferences comprising a setting to configure an application used to modify the content project;

responsive to a request received via the user interface from the administrative member effective to assign the project assets and the project preferences associated with the content project to selected other members of the particular team, generating a response that enables devices associated with the selected other members to download access data that content-creation applications use to surface the assigned project assets and the project preferences for use in modifying the content project, the response generated based, in part, on a determination of teams to which the selected other members belong; and communicating the response to the devices associated with the selected other members, the response causing generation of a non-administrative member user interface having options that are selectable by a non-administrative member of the particular team to surface the assigned project assets and the project preferences via the content-creation applications for use in modifying the content project.

11. A system as described in claim 10, wherein the response is further generated based on identification of the project assets and the project preferences associated with the content project from the project data indicative of the project assets and preferences associated with the content projects of the determined teams.

12. A system as described in claim 10, wherein the project data is further used to generate the non-administrative member user interface that enables the non-administrative member of the particular team to preview the assigned project assets and the project preferences.

13. A system as described in claim 10, wherein the assigned project asset comprises one of an image, a brush, or a color.

14. A system as described in claim 10, wherein the preferences include a menu.

15. One or more computer-readable storage media comprising instructions stored thereon that, responsive to execution by a computing device in a digital environment in which members of teams collaborate on digital content projects, cause operations of the computing device including to:

receive, by the computing device, a request to assign a project asset and a project preference to a selected member of the team, the request including an identifier of a project associated with assignment of the project asset and the project preference, the project asset comprising a created content item or tool for content creation that is usable by the selected member to modify the project, and the project preference comprising a setting to configure an application used to modify the project;

ascertain, by the computing device, a list of teams to which the selected member belongs;

check, by the computing device, assets and preferences associated with the teams on the list to identify, using the identifier, the project assets and preferences of the project that are assigned to the selected member;

generate, by the computing device, a response for communication to a device associated with the selected member that includes indications of the identified project assets and preferences, the indications enabling the device associated with the selected member to download access data the application uses to surface the identified project assets and preferences in connection with modifying the project, including surfacing the project asset and the project preference assigned to the selected member according to the received request; and communicate the response to the device associated with the selected member, the response causing the device associated with the selected member to generate a user interface, the user interface having options that are selectable by the selected member to surface the identified project assets and preferences via the application) for use in modifying the project.

16. One or more computer-readable storage media of claim 15 wherein the operations of the computing device include to combine a name of the team and names of the identified project assets and preferences to form the indications.

17. One or more computer-readable storage media of claim 15, wherein the indications each comprise a uniform resource identifier (URI) that enables the device associated with the selected member to download the access data for a corresponding project asset or preference via the application.

18. One or more computer-readable storage media of claim 15, wherein the response is configured to enable the user interface to present previews of the identified project assets and preferences to the selected member.

19. One or more computer-readable storage media of claim 15, wherein the assigned project asset comprises one of an image, a brush, or a color.

20. One or more computer-readable storage media of claim 15, wherein the assigned project preference causes at least a portion of the application to be configured with a theme.

* * * * *

UNITED STATES PATENT AND TRADEMARK OFFICE
CERTIFICATE OF CORRECTION

PATENT NO. : 10,204,318 B2
APPLICATION NO. : 14/755255
DATED : February 12, 2019
INVENTOR(S) : Sanjeev Kumar Biswas et al.

Page 1 of 1

It is certified that error appears in the above-identified patent and that said Letters Patent is hereby corrected as shown below:

In the Claims

Column 22, Line 65, after "...member effective to assign", insert -- "one or more of" --, therefor.

Column 24, Line 23, after "...preferences via the application)", delete ")", therefor.

Signed and Sealed this
Seventh Day of May, 2019

Andrei Iancu
*Director of the United States Patent and Trademark Office*